April 23, 1935.  F. M. CLARK  1,999,004
DIELECTRIC COMPOSITION
Filed June 17, 1933  2 Sheets-Sheet 1
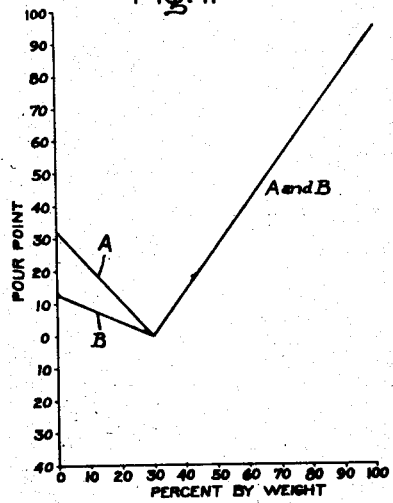
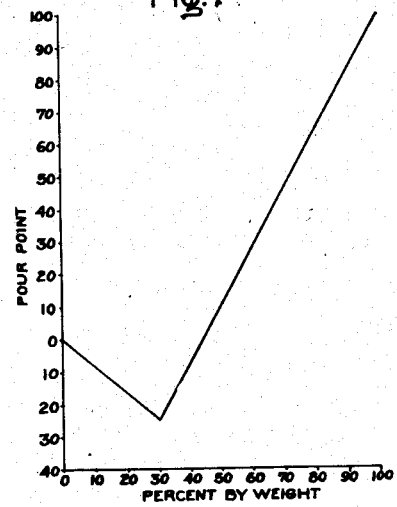
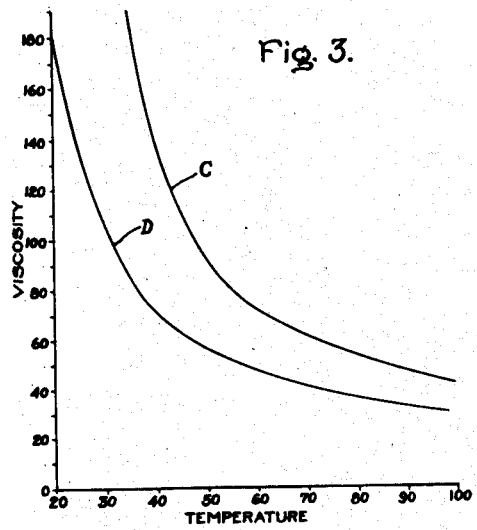
Inventor:
Frank M. Clark,
by Harry E. Dunham
His Attorney.

April 23, 1935. F. M. CLARK 1,999,004
DIELECTRIC COMPOSITION
Filed June 17, 1933 2 Sheets-Sheet 2
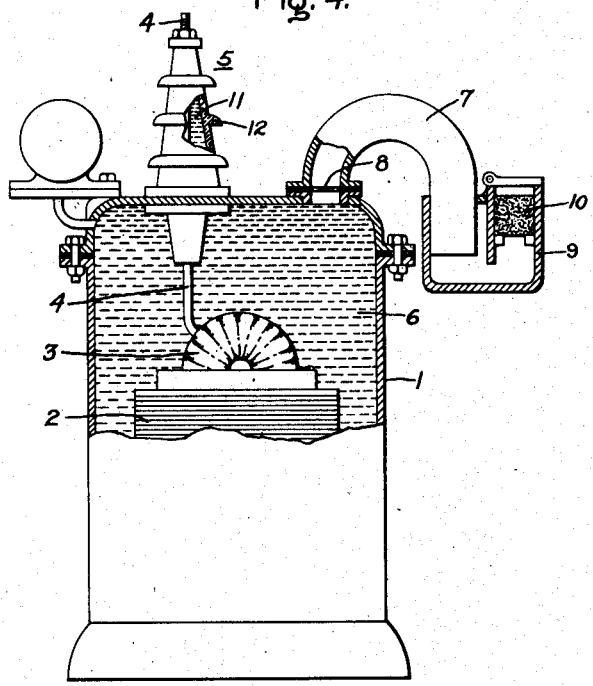
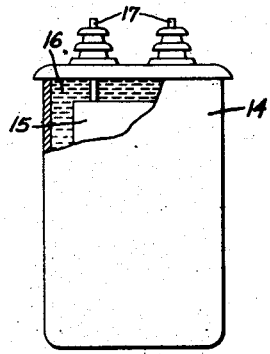
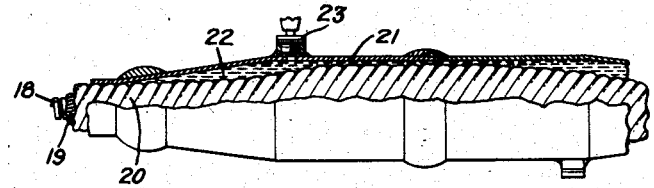
Inventor:
Frank M. Clark,
by Harry E. Dunham
His Attorney.

Patented Apr. 23, 1935

1,999,004

UNITED STATES PATENT OFFICE 1,999,004

DIELECTRIC COMPOSITION

Frank M. Clark, Pittsfield, Mass., assignor to General Electric Company, a corporation of New York Application June 17, 1933, Serial No. 676,315

16 Claims. (Cl. 252—1)

The present invention relates to compositions which are suitable for use in electrical devices for insulating, cooling, and other purposes.

The new compositions embodying the present invention are of utility in electric devices, such for example as electric transformer, capacitors, cables, and switches. They are of especial utility in electric devices in which chemically stable liquid material is desired for insulating, cooling, lubricating, or other purposes. It is highly desirable that a liquid insulating material should combine with good dielectric properties also certain physical properties such as a low viscosity and a low solidifying characteristic. It is also highly desirable to secure fireproof property, and this property should extend even to the gases arising from the material upon decomposition.

My invention provides dielectric compositions which combine in a high degree desirable electrical properties, non-inflammability, and desirable conditions of liquidity such as low viscosity and low solidifying or freezing temperatures.

The composition embodying my invention comprises in its broadest aspect the combination of halogenated aromatic compounds with condensed nuclei, such for example as naphthalene, anthracene, and phenanthrene, together with one or more unlike halogenated aromatic, or cyclic hydrocarbons. In particular it comprises the combination of a halogenated condensed aromatic hydrocarbon and a halogenated hydrocarbon comprising one or more phenyl groups in an open ring structure, that is compounds containing a phenyl group combined simply with hydrogen as in benzene, or with multiple phenyl groups which are not condensed, but are simply combined as an open ring structure, such as diphenyl and other polyphenyl compounds (including also polyphenyl compounds containing aliphatic radicals, such as diphenyl methane, diphenyl ketone, and dibenzyl). For the purpose of avoiding complication in terminology I shall term as phenyloid compounds all such compounds containing one or more uncondensed phenyl groups.

While I have for the purpose of illustration referred to the chlorine compounds as representative of halogen compounds I wish it to be understood that other halogens such as bromine, fluorine, and iodine compounds also come within the scope of my invention.

In some cases it is desirable to have present in the combination embodying my invention more than one phenyl compound, as for example both halogenated diphenyl and halogenated benzene, thereby securing a still lower viscosity and liquidity over a wider range of temperature. It is remarkable that a compound such as tetrachlor naphthalene, although solid at temperatures up to 95° C., is capable of lowering the viscosity and solidifying temperatures of various other materials including even materials which are liquid at low temperatures.

In the accompanying drawings I have shown in Figs. 1 to 3 inclusive graphs illustrative of physical characteristics of several compositions embodying my invention; Figs. 4, 5, and 6 respectively show somewhat conventionally a transformer, capacitor, and a short length of cable, as representative of electrical devices in which compositions embodying my invention can be used to advantage.

The graph shown in Fig. 1 shows the modifying effect of an addition of tetrachlor naphthalene to a chlorinated diphenyl composition. As solidification of organic mixtures of this kind does not occur at a sharply defined temperature analogous to a freezing point, but occurs gradually over a range of temperatures, the graph here shown has been plotted by using the pour point temperatures as determined by the method prescribed by Am. Soc. for Testing Materials under the designation D-97-30.

The chlorinated diphenyl embodied in the mixtures concerned in Fig. 1 consists largely of either hexachlor diphenyl or pentachlor diphenyl together with a minor content of chlorinated diphenyls of both lower and higher chlorine content. Curve A relates to mixtures in which the chlorinated diphenyl component consists preponderantly of hexachlor diphenyl and may be said to be a chlorinated diphenyl of about 60% chlorine content, such as may be obtained in the open market. The preparation of such a product is described in United States Patent 1,892,397 to Jenkins, patented December 27, 1932. It has a pour point of about 30° C. The graph represents conventionally the pour points, plotted as ordinates of mixtures containing in addition to this chlorinated diphenyl also increasing proportions of tetrachlor naphthalene. It will be observed that the addition of tetrachlor naphthalene up to about 30% lowers the pour point until at 30% content of tetrachlor naphthalene the pour point of the mixture has been depressed to about 0° to 5° C. With further increases of tetrachlor naphthalene the pour point rises but does not rise above the pour point of the chlorinated diphenyl component until the content of tetrachlor naphthalene has been increased to approximately 50%. The proportions here given and elsewhere herein are by weight.

Graph B relates to mixtures in which the chlorinated diphenyl component is a chlorinated diphenyl containing about 55% chlorine by weight, and consisting preponderantly of pentachlor diphenyl. In this case approximately the same minimum pour point is obtained with a mixture comprising about 70% of the chlor diphenyl component and 30 parts of the chlor naphthalene component. As the portions of the graphs A and B for mixtures containing more than 30% of chlorinated naphthalene so nearly coincide, but a single line has been used to represent both portions.

The dielectric constant of the mixtures throughout their entire range is between 4 and 5 which is substantially the same value as characteristic of the chlorinated diphenyl alone. This is true also of other electrical properties, as for example the dielectric strength and power factor.

Chlorinated compounds of naphthalene other than the tetrachlor may be employed, as for example the pentachlor naphthalene. Halogenated substitution products of other condensed benzene ring compounds similarly may be combined with other halogenated aromatic compounds in accordance with my invention.

A striking exemplification of the effect of chlor naphthalene in lowering the pour point of unlike halogenated aromatic hydrocarbons is illustrated by Fig. 2. This figure shows a graph of the pour point characteristic of mixtures of trichlor benzene and tetrachlor naphthalene. At ordinary temperatures trichlor benzene as a mixture of its isomers is a very mobile liquid of low viscosity. This liquid solidifies at a temperature of about 0° C. The addition of tetrachlor naphthalene up to about 30% lowers the pour point progressively. At about 30% content of tetrachlor naphthalene the pour point of the mixture reaches the value of minus 25° C. This temperature is about as low as any winter temperatures encountered ordinarily in northern climates where electric devices are operated exposed to outdoor temperatures. Further additions of tetrachlor naphthalene increases the pour point of the mixtures which rise above the pour point of trichlor benzene when the content of tetrachlor naphthalene approaches a value of about 50%.

The viscosity of a mixture of chlorinated diphenyl and chlorinated naphthalene also is lower than the viscosity of chlorinated diphenyl alone. For example, chlorinated diphenyl (54% chlorine content) unassociated with chlorinated naphthalene at 30° C. has a viscosity of about 3,000 centipoise (MacMichael). A mixture containing 70% by weight of this compound and 30% by weight of tetrachlor naphthalene has a viscosity of only 300 centipoise (MacMichael). Chlorinated diphenyl containing 60% chlorine has a viscosity at 98.9° C. of approximately 80 seconds Saybolt. A composition of 70% of this product and 30% of tetrachlor naphthalene has a viscosity at this temperature of only 40 seconds Saybolt. (At 30° C. the 60% chlor diphenyl product is too viscous to permit its viscosity to be determined accurately.

In Fig. 3 there are plotted two graphs showing the viscosity in units of seconds Saybolt at different temperatures of halogenated hydrocarbon mixtures. Graph C shows the viscosity over the range of temperature from 35° C. to 100° C. of a mixture of 75% of chlorinated diphenyl (60% chlorine) and 25% trichlor benzene, no tetrachlor naphthalene being present. Graph D shows the viscosity over a range of temperature from 20° C. to 100° C. of a mixture containing about 45% chlorinated diphenyl (60% chlorine) about 25% trichlor benzene and about 30% tetrachlor naphthalene. The viscosity over the entire range is lowered by the chlor naphthalene. At 37.8° C., which is the usual testing temperature, the viscosity is about 77 seconds Saybolt. The pour point is about minus 16° C.

A low viscosity is desirable in insulating liquids when one of their chief functions is to cool as well as insulate an electric device. This function is of particular importance in electric transformers, and similar devices. It also is of importance in liquid-quenched switches. The viscosity of the mineral hydrocarbon oil which is used in electric transformers and switches is of the same order of magnitude as the viscosity of the mixture of graph D.

In some cases it is desirable to employ dielectric compositions of even lower pour point and viscosity. For such purposes a mixture may be chosen comprising chlorinated diphenyl, tetrachlor naphthalene, and a higher percentage of trichlor benzene than the mixture above described.

The electrical devices of Figs. 4, 5, and 6 are shown as illustrative of different types of service for which the compositions embodying my invention are adapted. The transformer shown in Fig. 4 comprises the usual combination of a tank 1 in which are located the core 2 and the electrical windings 3. One of the terminals 3 of the windings is shown as being connected by a conductor 4 to an external high tension bushing 5, the other terminal being hidden in the view. The tank contains a mixture 6 of halogenated materials embodying my invention. To take care of the evolution of gas from the mixture when subjected to arcing or other agencies which might produce decomposition, a pressure release conduit 7 is provided which communicates with the main tank 1, but in ordinary service is separated by an easily frangible diaphragm 8. The conduit 7 communicates with a container 9 in which an absorbent 10 for halogenated gases is provided, for instance soda lime. The high tension bushing 5 may in some cases also be provided with a mixture of dielectric materials embodying my invention as indicated at the region shown in section. A liquid or semi-solid composition 11 which also may embody the present invention is placed between the conductor 4 and the outer case 12.

The capacitor shown in Fig. 5 comprises a casing 14 shown in part broken away. Within it are condenser plates, or armatures, 15 and a liquid dielectric 16 embodying my invention. The armatures 15 may be separated as usual by paper or other forms of dielectric material which will keep them mechanically separated. They are connected to external contacts 17.

In Fig. 6 is shown a cable joint comprising a core 18, cable conductors 19, and surrounding porous insulation 20, such as paper, all these elements being surrounded by a casing 21. A liquid halogenated composition embodying my invention as shown at 22 is provided in the casing surrounding the cable elements. For its introduction there is provided an inlet tube 23. This composition soaks into the porous insulation and surrounds the conductor members of the cable.

In electric devices, such as transformers for example, in which it is desirable to completely eliminate fire risk, the balance of hydrogen and halogen in mixtures embodying my invention should be so chosen that gases evolved upon decomposition, as may occur when an arc comes into contact with the insulating mixture, consist essentially of a halogen hydride which is non-inflammable. The proper balance may be present in each component, that is, when each contains chemical equivalency of chlorine and hydrogen. Or, the proper balance in the mixture may be obtained by mixing a compound containing a preponderance of hydrogen with a compound containing the proper preponderance of halogen. This feature of the described compositions is covered by claims in my United States Patents Nos. 1,931,455 and 1,931,473, issued October 17, 1933.

As already indicated above, various phenyloid compounds containing two or more phenyl groups linked or otherwise combined with aliphatic groups or radicals may be employed admixed with halogenated aromatic compounds with a condensed structure for the purposes of my invention. One of these compounds, namely chlorinated diphenyl methane, may be prepared as described in a copending application Ser. No. 664,361, filed April 4, 1933. As herein described, such a compound in which two phenyl groups, $C_6H_5$, are linked by an alkyl group, $CH_2$, may be made by causing the reaction to occur between monochlor benzyl chloride and monochlor benzene in the presence of a condensation agent, such as aluminum chloride. In place of monochlor benzyl chloride I may employ benzyl chloride having higher chlorine content, as for example dichlor benzyl chloride or trichlor benzyl chloride. In accordance with said invention, compounds of this type also may be prepared by causing a reaction to occur between benzyl chloride or its halogenated derivatives and monochlor benzene, the latter preferably being in molecular excess.

In accordance with another copending application, Ser. No. 664,360, filed April 4, 1933, various forms of halogenated diphenyl ketone may be prepared, for example, by the direct chlorination of diphenyl ketone in which phenyl groups are linked by a CO group in the presence of a catalyst, such as iron.

In accordance with a copending application Ser. No. 664,359, filed April 4, 1933, various forms of liquid and solid halogenated dibenzyl compounds may be prepared by condensation. For example, chlorinated dibenzyl may be prepared by heating to a reaction temperature in the presence of aluminum chloride, a mixture of ethylene dichloride, and trichlor benzene. In a dibenzyl compound phenyl groups are linked by two $CH_2$ groups, namely $C_6H_5 \cdot CH_2 \cdot CH_2 \cdot C_6H_5$. These compounds are mentioned as examples of equivalents, in their halogenated forms, of halogenated diphenyl for the field of my present invention.

What I claim as new and desire to secure by Letters Patent of the United States is:

1. A liquid composition of matter comprising as substantial ingredients the combination of a minor proportion of halogenated aromatic hydrocarbon of the class having condensed nuclei and a major proportion of halogenated phenyloid hydrocarbon.

2. A liquid composition of matter comprising as substantial ingredients the combination of a minor proportion of chlorinated aromatic hydrocarbon of the class having condensed nuclei and a major proportion of chlorinated phenyloid hydrocarbon.

3. A liquid composition of matter comprising the combination of a minor proportion of halogenated naphthalene and a major proportion of halogenated phenyloid hydrocarbon.

4. A liquid composition of matter comprising the combination of a substantial proportion less than 50 per-cent of a solid chlorine compound of naphthalene and a substantial proportion more than 50 per cent of a liquid chlorine compound of a phenyloid hydrocarbon.

5. A liquid composition of matter comprising chlorinated naphthalene and chlorinated diphenyl in substantial amounts, said composition having a lower viscosity and lower pour point than said chlorinated diphenyl when the latter is unassociated with said chlorinated naphthalene.

6. A dielectric composition consisting preponderantly of tetrachlor naphthalene and chlorinated diphenyl.

7. A liquid material for electrical insulating and cooling purposes consisting of tetrachlor naphthalene, chlorinated diphenyl and trichlor benzene.

8. A composition adapted for insulating and cooling purposes comprising by weight about 45% of chlorinated diphenyl having a 60% chlorine content, and 25% by weight of trichlor benzene, and about 30% by weight of tetrachlor naphthalene.

9. A liquid composition consisting of a minor proportion of chlorinated aromatic hydrocarbon of the class having condensed nuclei and a major proportion of chlorinated diphenyl, the latter compound containing by weight at least about 54% of chlorine, said composition having a lower viscosity than said diphenyl compound.

10. A liquid dielectric composition consisting preponderantly of tetrachlor naphthalene and chlorinated diphenyl, the latter compound containing at least about 54% chlorine by weight.

11. A liquid dielectric composition consisting by weight of about one third of a solid chlorine compound of naphthalene and about two thirds of a chlorine compound of a phenyloid hydrocarbon.

12. A liquid composition adapted for electrical insulating and cooling purposes comprising substantial amounts respectively of solid chlorinated naphthalene and liquid chlorinated benzene, said composition having a materially lower pour point than either of said ingredients.

13. A dielectric composition consisting of a major proportion of trichlor benzene and a minor proportion of tetrachlor naphthalene, said composition being liquid over a temperature range below 0° C.

14. A liquid composition suitable for electrical insulating purposes comprising as essential ingredients substantial amounts of chlorinated naphthalene and of a chlorinated compound containing a plurality of uncondensed phenyl groups.

15. A liquid composition consisting substantially of chlorinated naphthalene, a halogenated phenyloid compound containing a plurality of phenyl groups and chlorinated benzene.

16. A liquid material suitable for use in electrical devices comprising essentially chlorinated naphthalene, a chlorinated diphenyl compound and trichlor benzene.

FRANK M. CLARK.

DISCLAIMER 1,999,004.—*Frank M. Clark*, Pittsfield, Mass. DIELECTRIC COMPOSITION. Patent dated April 23, 1935. Disclaimer filed July 2, 1937, by the assignee, *General Electric Company*.

Hereby enters this disclaimer to claims 12, 15, and 16 of said Letters Patent.
[*Official Gazette July 27, 1937.*]